J. A. PERKINS.
ROLLER BEARING CAGE.
APPLICATION FILED JAN. 14, 1913. RENEWED APR. 14, 1916.
1,205,387.  Patented Nov. 21, 1916.
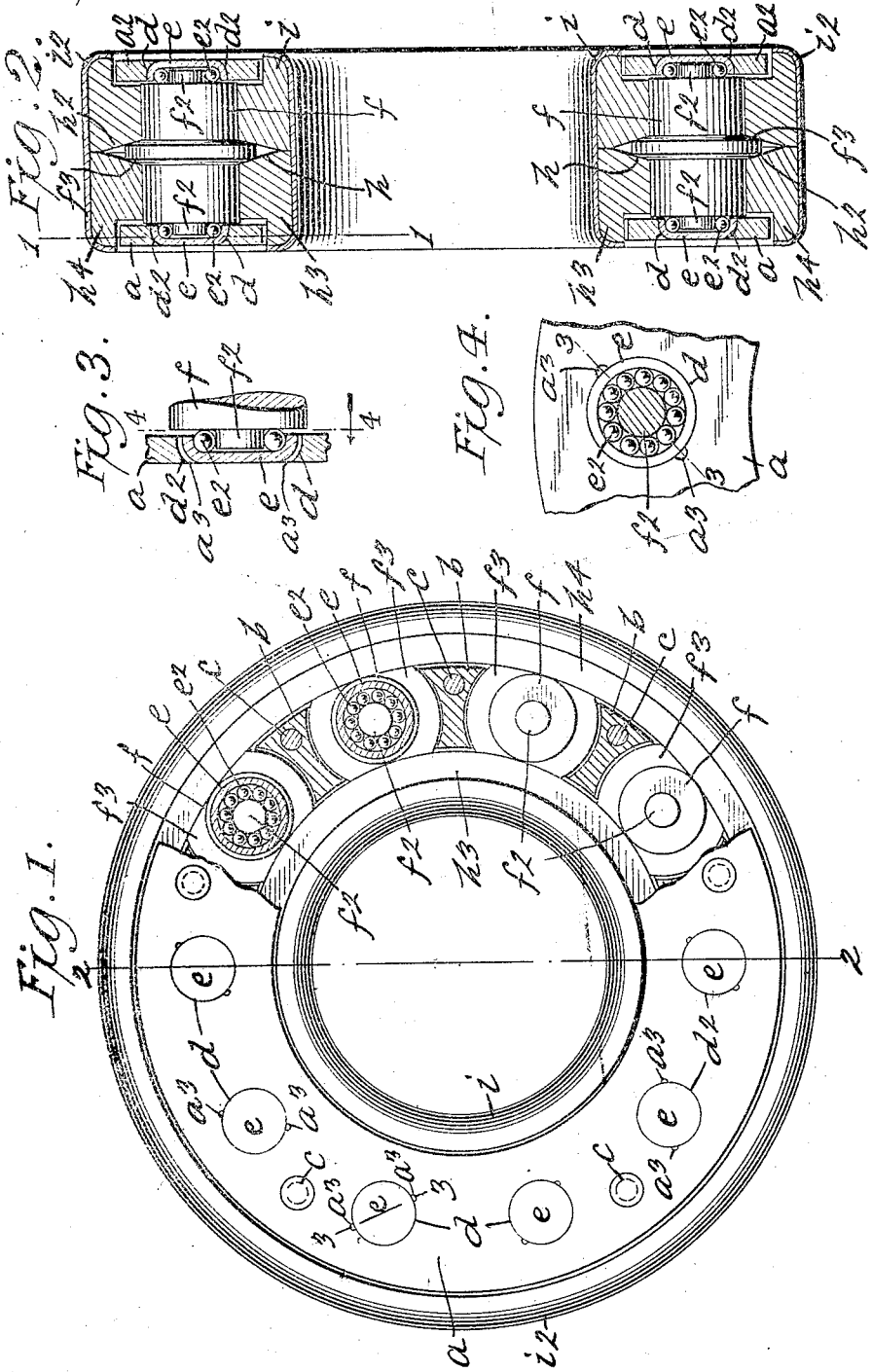

UNITED STATES PATENT OFFICE.

JULIUS A. PERKINS, OF NEW YORK, N. Y.

ROLLER-BEARING CAGE.

1,205,387.  Specification of Letters Patent.  Patented Nov. 21, 1916.

Application filed January 14, 1913, Serial No. 741,906. Renewed April 14, 1916. Serial No. 91,265.

*To all whom it may concern:*

Be it known that I, JULIUS A. PERKINS, a citizen of the United States of America, and residing at New York, in the county of New York and State of New York, have invented certain new and useful Improvements in Roller-Bearing Cages, of which the following is a specification, such as will enable those skilled in the art to which it appertains to make and use the same.

This invention relates to roller bearings and has more especial reference to rollers and the guiding cages thereof which are adapted for use in limited spaces with a maximum load carrying capacity. It bears some resemblance to several other forms shown in co-pending applications, particularly to that form shown in my application for Letters Patent of the United States bearing date of Dec. 10, 1912, Serial No. 735,900, but with the distinction that, in the present form, I am enabled to employ a roller of greater length for the same cage length, thereby increasing the load capacity very materially.

In the forms already disclosed, each of which serves its purposes, I provide recesses in the cage end plates for the roller end cups and which extend only partially through the said end plates, but in the present form I extend the said recesses, in the form of circular bores, entirely through the end plates, thus permitting the roller cup faces to be approximately flush with the outer surfaces of the end plates, suitable means, such as a bead or the like, being provided to retain the cups in the bores against passage therethrough, thereby permitting the use of very thin end plates and a correspondingly increased roller length for a fixed cage length and, while I have shown the invention in connection with a flanged roller and specific bearing members, I do not confine myself to this or any other form.

My invention is fully set forth in the following specification, of which the accompanying drawings form a part, in which the separate parts are designated by the same reference characters in each of the views, and in which:—

Figure 1 is an end view of a roller bearing constructed in accordance with my present invention, with one cage end plate partly broken away to show the construction, and partly in section on the line 1—1 of Fig. 2, approximately; Fig. 2 is a section taken on the line 2—2 of Fig. 1; Fig. 3 is an enlarged, fragmentary, section taken on the line 3—3 of Figs. 1 and 4; and Fig. 4 is a section taken on the line 4—4 of Fig. 3.

In the drawings forming a part of this application I have shown a roller guiding cage comprising end plates $a$ and $a^2$ joined, in the present showing, by ribs $b$ formed of portions integral with corresponding end plates, the cage elements being locked together by means of rivets $c$ or suitable equivalent, but I merely refer to this cage construction for convenience of description, as many other forms might be designed which would be just as adaptable to my present invention.

The end plates $a$ and $a^2$ are each provided with a plurality of recesses $d$ extended entirely therethrough but of a lesser diameter at the outer surfaces of the end plates than at the inner, and this formation may be accomplished by boring or stamping, or bores of the same diameter may first be formed in the end plates and the outer ends formed into beads by pressure, or any other method of accomplishing the desired result may be employed, as the exact configuration of the recesses is not an essential to this invention, as long as the roller cups are prevented from escaping.

Resting in each of the recesses $d$ is a hardened cup $e$, serving as a raceway for a series of balls $e^2$ interposed between the rollers $f$ and the cups, said balls being arranged about the end pintles $f^2$ of the rollers, thus taking the roller endwise movement and any abnormal roller movement anti-frictionally and maintaining the rollers in exact alinement at all times.

The rollers $f$, in the form shown, are each provided with a flange $f^3$ intermediate the ends thereof, said flanges moving in grooves $h$ and $h^2$, of a configuration similar to the flanges, in the inner and outer bearing members $h^3$ and $h^4$, respectively, said bearing members being formed of two parts, each, to enable assembling of the flanged rollers therein, and said parts are held together by means of flanged rings $i$ and $i^2$, respectively, said rings being flanged in the operation of assembling the bearing members but, while this showing provides a perfectly satisfactory combination under certain conditions, I do not limit myself to any specific bearing member, roller, or cage construction, other than such a combination and construction of the cage end plates which permits of the roller end cups being substantially flush with the outer surfaces thereof.

By reference to Fig. 2, it will be seen that the cups are flush with each surface of the end plates, and this permits the use of very thin cage end plates and, consequently, of an increased length of roller therebetween, thereby materially increasing the load bearing capacity of the rollers, in a cage of given length, over that of the length of roller possible in the application referred to, and without any sacrifice of the advantages possessed by the latter form.

In practice, I prefer to provide a groove $a^3$ in the periphery of each of the recesses $d$ which shall be open to both the inner and outer surfaces of the end plates to permit a clearance of any refuse or other objectionable matter which might enter between the cups and the end plates, and I may, as shown, employ a plurality of the said grooves at each recess, but arranged preferably away from the radial line of the cage itself, to avoid weakening the end plates and, while not shown, I prefer to make the grooves slanting or spiral to assist in such clearance, particularly in the grooves nearest the cage end plate peripheries, where centrifugal action assists in the operation of dirt removal.

It will thus be seen that not only do I permit the use of rollers of the greatest possible length for a cage of given length, but I also provide anti-frictional roller guiding means and hardened raceways for the said means within but distinct from the cage end plates, thus permitting the cage to be of relatively soft material and, further, I provide means for insuring the ready egress of any objectionable matter which might tend to injure the cups or end plates, or interfere with free operation, thus producing a thoroughly practical bearing for certain purposes and which, in the form shown, is also self-contained as to the cage of rollers and the bearing members.

Having fully described my invention, what I claim as new, and desire to secure by Letters Patent, is:—

1. A cage for roller bearings, comprising end plates and connecting ribs, rollers carried by said cage and provided, each, with end pintles, and a guiding cup for each end of each of said rollers, said cage end plates being provided with bores therethrough in the position of each roller end to receive loosely, a corresponding guiding cup, said bores being of less diameter on the outer surfaces of said end plates than on the inner surfaces.

2. A cage for roller bearings, comprising end plates and connecting ribs, rollers carried by said cage and provided, each, with end pintles, and a guiding cup for each end of each of said rollers, said cage end plates being recessed in the position of each roller end to receive, loosely, a corresponding guiding cup and said guiding cups being substantially flush with the outer surfaces of said end plates.

3. A cage for roller bearings, comprising end plates and connecting ribs, rollers carried by said cage and provided, each, with end pintles, and a guiding cup for each roller end, said cage end plates being provided with bores therethrough in the position of each roller end to receive, loosely, a corresponding cup, and being also provided with a groove at the periphery of each of said bores to permit the escape of foreign matter which might enter between said cups and end plates.

4. In a bearing provided with a cage, rollers therein, and end pintles on said rollers; a cup on each of said pintles, and a series of balls interposed between said rollers and cups, said cage being provided with bores in the positions of said cups to receive the same, loosely, and of less diameter on the outer surfaces of the cage end plates than on the inner surfaces to prevent the escape of said cups.

In testimony that I claim the foregoing as my invention I have signed my name in presence of the subscribing witnesses this 9th day of January, 1913.

JULIUS A. PERKINS.

Witnesses:
J. C. LARSEN,
J. A. DELATOUR.